United States Patent [19]

Omae et al.

[11] 4,437,527

[45] Mar. 20, 1984

[54] COMBINATION WEIGHING MACHINE

[75] Inventors: Michinobu Omae, Akashi; Takashi Hirano, Kobe, both of Japan

[73] Assignee: Yamato Scale Company, Ltd., Hyogo, Japan

[21] Appl. No.: 399,326

[22] Filed: Jul. 19, 1982

[51] Int. Cl.³ .............................................. G01G 19/32
[52] U.S. Cl. ......................................... 177/25; 177/59
[58] Field of Search ..................... 177/25, 59, 145, 52

[56] References Cited

U.S. PATENT DOCUMENTS

| 4,267,894 | 5/1981 | Hirano | 177/25 |
| 4,308,928 | 1/1982 | Oshima | 177/25 |

Primary Examiner—Joseph W. Hartary
Attorney, Agent, or Firm—Eugene E. Geoffrey, Jr.

[57] ABSTRACT

A combination weighing machine, which is typically used for packing a plurality of articles in each bag or the like so that the total weight of each bag becomes nearly equal to a predetermined target weight, including a plurality of weighing balances for weighing the articles at the same time, arithmetic means for selecting some of these balances so that the total weight of the articles thereon meets with a predetermined condition and means for unloading the selected balances to collect the articles thereof and then loading them with new articles, respectively, to initiate the next cycle of operation; each balance being accompanied with at least two holding hoppers and corresponding memories, and means for distributing each batch of articles weighed by the corresponding balance to each hopper and supplying the weight of each batch to the corresponding memory, thereby subjecting all batches of articles in all holding hoppers to the combination selection of said arithmetic means with the contents of the corresponding memories, to improve weighing efficiency and accuracy without increasing the number of expensive weighing balances.

3 Claims, 4 Drawing Figures

COMBINATION WEIGHING MACHINE

This invention relates to an improved combination weighing machine having increased efficiency and accuracy with relatively low manufacturing cost.

The weighing device, which is generally referred to as "combination balance" or "combination weighing machine" is used for extracting a plurality of articles from a group of articles, such as candies, fruits or vegetables, having relatively large variances in their unit weights, to form a subgroup having a weight which is substantially equal to a predetermined target weight or, in general, which satisfies a predetermined condition. An example of such a device is described in U.S. Pat. No. 4,267,894. The device comprises a plurality of weighing units each including a relatively delicate and expensive weighing balance and accompanying weight sensor. It can be easily understood that the efficiency of extraction with a total weight satisfying a predetermined condition from these weighing units or batches of articles in combination and the accuracy of the total weight of the extracted batches with respect to the target weight should be raised with the number of balances included in the machine. However, increase of the number of weighing units results necessarily in an unwanted increase of the machine price. In order to overcome this problem, an idea was proposed in U.S. Pat. No. 4,308,928. The combination weighing machine of this patent includes a single weighing unit, a plurality of holding hoppers and corresponding memories for storing weight information of the articles in the respective hoppers, and effects a combination selecting operation with the contents of these memories. Although this machine could significantly reduce the number of expensive weighing units, it had to include a bulky distributing mechanism for distributing the batches of articles successively weighed by the single weighing unit to the respective holding hoppers. This has resulted in an unwanted increase of the overall volume and weight of the machine and, further, fatal reduction of working efficiency due to the lengthy time for distributing the articles to all of the vacant hoppers.

Accordingly, an object of this invention is to provide an improved combination weighing machine having a fewer number of weighing units but exhibiting higher efficiency and accuracy as compared with the prior art machines having the same number of weighing units.

This object can be attained substantially by the combination weighing machine according to this invention, which comprises a plurality of weighing units for weighing batches of articles having random weights, respectively, and a common collection chute. Each weighing unit includes at least two holding hoppers each accompanied by a memory and means of distributing the weighed batches of articles to the respective hoppers and the corresponding weight information to the corresponding memories. The machine further comprises means for selecting a combination of the batches of articles having a total weight satisfying a predetermined condition of weight from the content of all memories, and means for discharging the selected batches into the collection chute from the corresponding holding hoppers.

The invention will be described in detail hereinunder in conjunction with a preferred embodiment with reference to the accompanying drawings.

IN THE DRAWINGS

Throughout the drawings, like reference numerals are used to denote corresponding circuit components.

Figure 1:
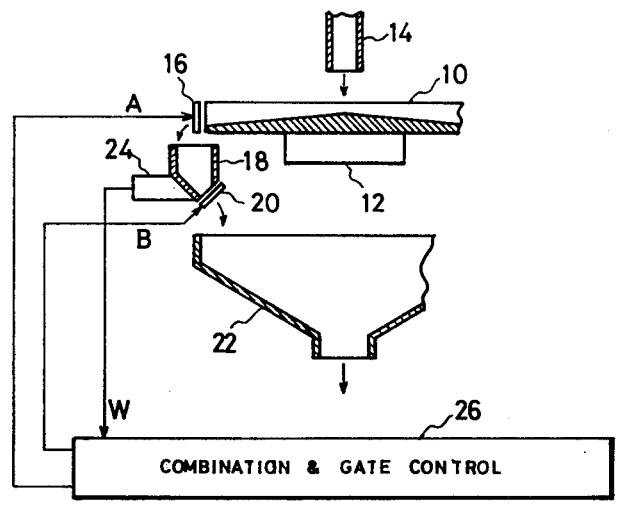
FIG. 1 is a schematic view representing a typical arrangement of a prior art combination weighing machine.

Referring now to FIG. 1 which shows a schematic view of a mechanical arrangement of a typical automatic combination weighing machine according to the prior art. The machine includes a vibration feeder 10 having a slightly conical bottom wall and a peripheral side wall. The feeder 10 is provided with a vibrator 12 for applying vibration to the bottom wall so that articles supplied from a central chute 14 are shifted outwardly to the peripheral portion. The peripheral wall of the feeder 10 has a plurality of exit ports each having a gate 16, though only one gate 16 is shown for simplification. The gates 16 are normally closed and selectively opened under control of loading signals A from a combination and gate control unit 26 as described later. The machine also includes a plurality of weighing balances arranged surrounding the feeder 10 so that their weighing cradles 18 are disposed respectively just under the exit ports of the feeder 10. Although only one weighing cradle 18 is shown for the purpose of simplification of the drawing, it is understood that the articles on the feeder 10 are fed into some of the weighing cradles 18 when the corresponding gates 16 are opened. Each weighing cradle 18 has a bottom opening having a gate 20 which is normally closed and selectively opened under control of unloading signals B from the combination and gate control unit 26 as also described later. Each weighing balance also includes a weight sensor 24, such as a load cell, which produces an electric signal W indicative of the weight of articles in the cradle 18 and supplies it to the combination and gate control unit 26. Under the unloading gates 20 of the respective weighing balances, a common collecting chute is disposed for collecting the articles discharged from the selected weighing balances. The articles collected in the chute 22 are transferred by suitable means (not shown) to the next packing process.

Figure 2:
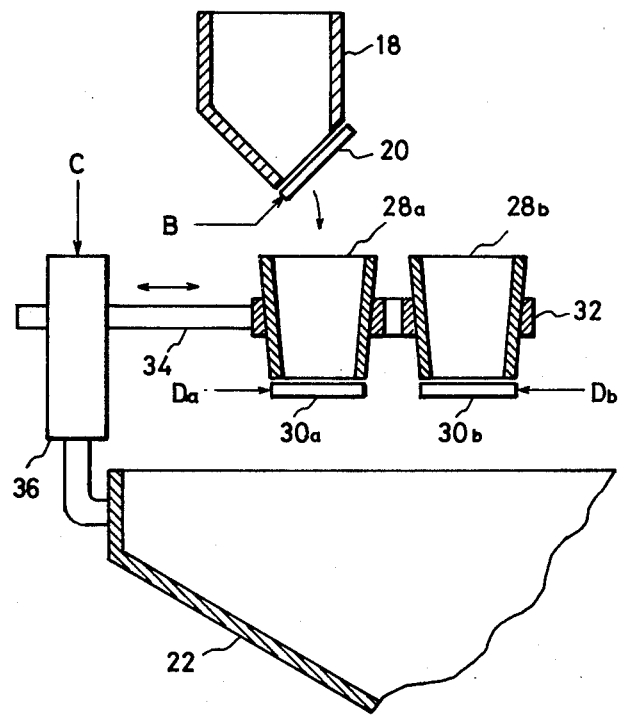
FIG. 2 is a schematic sectional view representing an embodiment of the mechanical portion of the combination weighing machine according to this invention.

FIG. 2 shows a holding hopper assembly disposed between the weighing cradle 18 of each weighing balance and the common collecting chute 22 in accordance with this invention. In this embodiment, the hopper assembly includes a pair of holding hoppers 28a and 28b having bottom openings closed by gates 30a and 30b, respectively. While the gates 30a and 30b are closed normally, they are selectively opened in response to gating signals Da and Db, respectively, from the combination and gate control unit 26, as described later. The hoppers 28a and 28b are supported by a frame 32 coupled to a movable bar 34 which is mechanically coupled to a hopper driving device 36. The hopper driving device 36 is arranged to move the hopper assembly from its initial position as shown to a second position in which the hopper 28b is just under the gate 20 of the cradle 18 in response to the leading edge of a hopper driving pulse C from the combination and gate control unit 26 and return it to the initial position in response to the trailing edge of the pulse C, as described later. The design of the hopper driving device 36 may be optional and can be easily anticipated by those skilled in the art.

Figure 3:
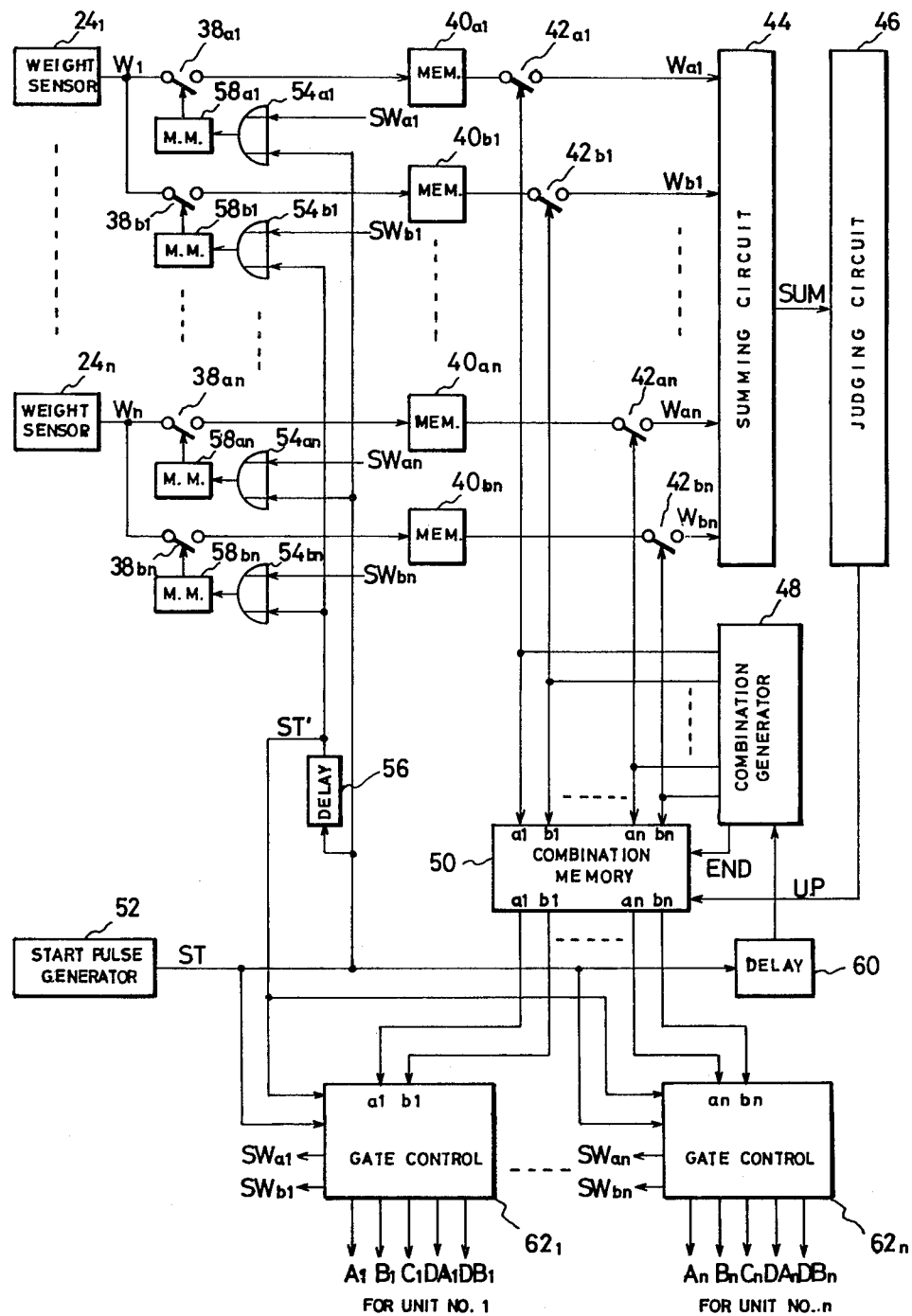
FIG. 3 is a block diagram representing an embodiment of a circuit configuration of the inventive combination weighing machine.

FIG. 3 shows, in block form, an embodiment of a circuit configuration of the combination and gate control unit 26 according to this invention. It is assumed that the machine includes n-number of weighing balances as a general case. The weighing balances have weight sensors $24_1, \ldots 24_n$, respectively, having outputs each coupled through a pair of signal paths to a summing circuit 44. More particularly, the weight sensor $24_i$ (i=1, 2, ... n) is coupled through a normally-open switch $38ai$, a memory $40ai$ and another normally-open switch $42ai$ to the summing circuit 44 and also coupled similarly through a normally-open switch $38bi$, a memory $40bi$ and a normally-open switch $42bi$ to the summing circuit 44. The summing circuit 44 serves to sum the incoming weight signals to provide a sum signal SUM to a judging circuit 46. The judging circuit 46 compares the sum signal with a preset condition and produces an update signal UP when the condition is satisfied. Such an arrangement of a judging circuit is known in the art and some examples are described in the aforementioned United States patents. The normally-open switches $42ai$ and $42bi$ have control terminals coupled respectively from 2n-number of output terminals of a combination generator 48.

The combination generator 48 is driven by a clock pulse train produced by a suitable clock pulse generator included therein and produces a binary code "1" or "0" from each of the output terminals in accordance with a predetermined set of mathematical combinations. Each of the normally-open switches $42ai$ and $42bi$ is closed in response to the output "1" to pass the corresponding weight signal Wai or Wbi toward the summing circuit 44. As well known in the art, there are $(2^{2n}-1)$ combinations in total of the 2n-number of output terminals of the combination generator 48. If all of these combinations are concerned, the combination generator 48 may include a 2n-bit binary counter for counting the clock pulses, with its bit or parallel outputs coupled to the output terminals, respectively. The combination generator 48 is arranged to start its operation in response to a start signal ST supplied from a start pulse generator 52 through a delay circuit 60 and to produce an end signal END when it completes each cycle of operation, as described later.

The outputs of the combination generator 48 are also coupled respectively to 2n-number of input terminals (ai, bi) of a combination memory 50 having the same number of corresponding output terminals (ai, bi). The combination memory 50 is arranged to update its content with its current inputs in response to the update signal UP from the judging circuit 46 and discharges its content from the corresponding output terminals in response to the END signal from the combination generator 48. Thus, the combination memory 50 produces binary "1" outputs every cycle of operation from some of its output terminals corresponding to those memories $40ai$ and/or $40bi$ which store the weight information having a sum which best satisfies the preset condition. The n pairs of outputs (ai, bi) of the combination memory 50 are coupled respectively to n gate control circuits $62_1, \ldots 62_n$ as their first and second inputs (ai, bi), which will be described later.

The normally-open switches $38ai$ and $38bi$ are arranged to be closed in response to output pulses from monostable multivibrators $58ai$ and $58bi$, respectively, which produce switching pulses having predetermined durations in response to the output signals of OR gates $54ai$ and $54bi$, respectively. The start signal ST from the start pulse generator 52 is further applied to first inputs of the OR gates $54ai$ directly and to first inputs of the OR gates $54bi$ through a delay circuit 56 as delayed start signal ST'. The signals ST and ST' are also applied to the gate control circuits $62_i$ as auxiliary signals and the circuits $62_i$ provide switching signals SWai to second inputs of the OR gates $54ai$ and switching signals SWbi to second inputs of the OR gates $54bi$, respectively, as described later.

Figure 4:
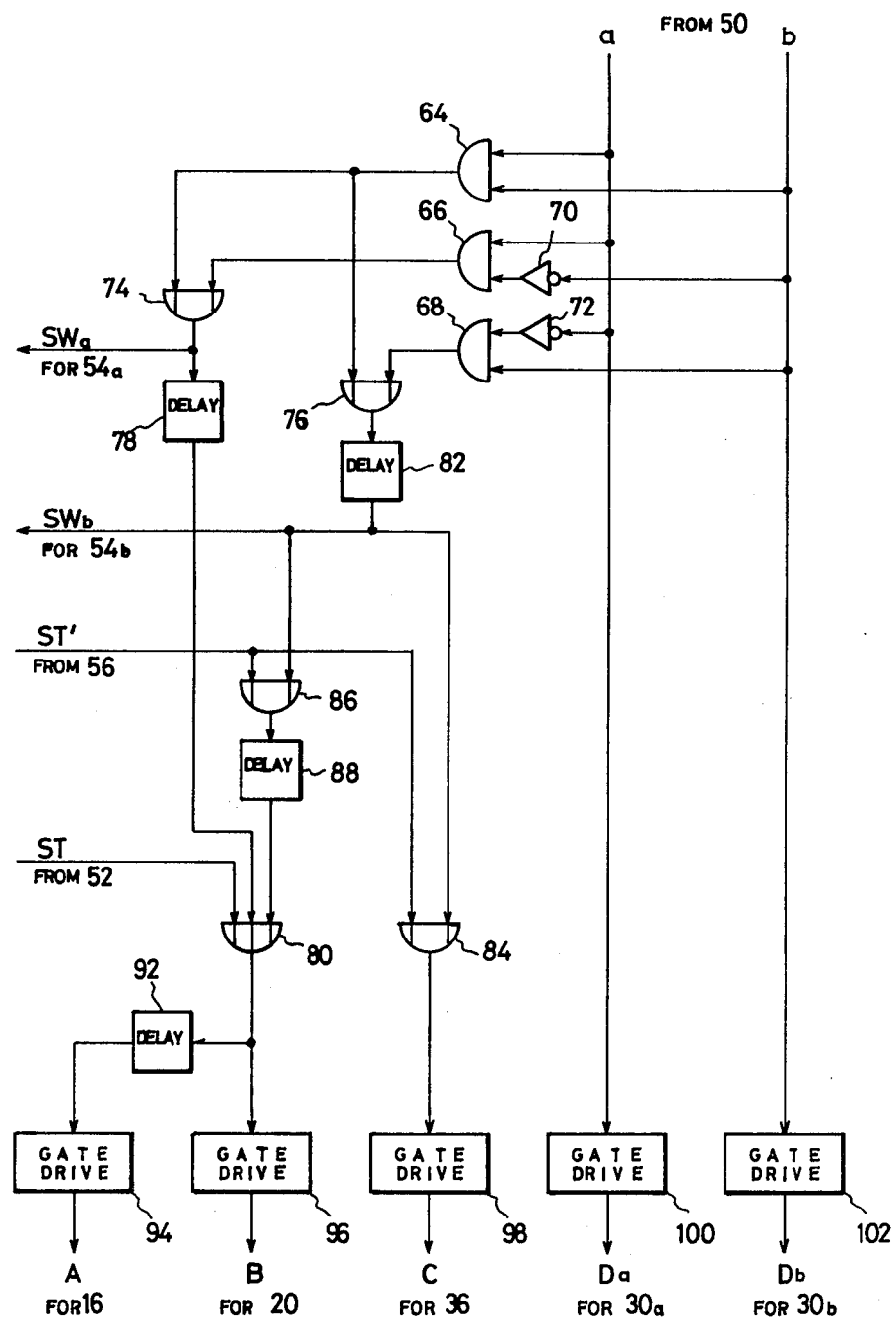
FIG. 4 is a partly block logic diagram representing an embodiment of a circuit configuration of the gate control circuit of FIG. 3.

FIG. 4 shows a preferred embodiment of the gate control circuits $62_1, \ldots 62_n$. As all of these circuits are exactly the same in both structure and operation, the description will be made in conjunction with a specific one of them and the suffixes such as 1, ... i, ... n of the reference numerals and symbols will be omitted for simplification.

As described previously, each gate control circuit 62 is supplied with a pair of output signals from the combination memory 50 at its first and second input terminals a and b, respectively. As shown, the input terminals a and b are coupled to first and second inputs of an AND gate 64 and also to gate drive circuits 100 and 102, respectively. The input a is also coupled to the first input of an AND gate 66 directly and to the first input of an AND gate 68 through an invertor 72, while the input b is also coupled to the second input of the AND gate 66 through an invertor 70 and to the second input of the AND gate 68 directly. The outputs of the AND gates 64 and 66 are coupled to both inputs of an OR gate 74 and the outputs of the AND gates 64 and 68 are coupled to both inputs of an OR gate 76. The output of the OR gate 74 is coupled through a delay circuit 78 to an OR gate 80 and the output of the OR gate 76 is coupled through a delay circuit 82 to an OR gate 84. The output of the delay circuit 82 is also coupled through an OR gate 86 and a delay circuit 88 to another input of the OR gate 80. The third input of the OR gate 80 is coupled to receive the start signal ST from the start pulse generator 52, and the second inputs of the OR gates 84 and 86 are coupled to receive the delayed start signal ST' from the delay circuit 56. The output signals of the OR gate 74 and the delay circuit 82 are also applied as switching signals SWa and SWb to the OR gates $54a$ and $54b$ (FIG. 3), respectively. The outputs of the OR gates 80 and 84 are coupled to gate drive circuits 96 and 98, respectively, the output of the OR gate 80 is also coupled through a delay circuit 92 to another gate drive circuit 94.

Now, the operation of the combination and gate control unit 26 will be described with reference to FIGS. 3 and 4. In operation, the start pulse generator 52 produces a train of pulses ST at predetermined time intervals which is essentially equal to one cycle time of operation of this machine. Before starting the description of operation, it is assumed that all the weighing cradles 18 of the machine have been loaded with articles and the corresponding weight signals W are provided from the respective weight sensors 24, and that the holding hopper assembly is in its initial position as shown in FIG. 2. The description will be made only in conjunction with the components associating with a specific weighing unit, since the same description can be applied to the other units. Therefore, the suffix numerals 1, 2, . . . i, . . . n, are omitted from the reference symbols for simplification.

First, the start signal ST is applied from the start pulse generator 52 through the OR gate to the monostable multivibrator 58a. The multivibrator 58a provides a narrow pulse to the normally-open switch 38a to close it temporarily, so that the current weight signal WA from the weight sensor 24 is written into the memory 40a. The start signal ST is also applied through the OR gate 80 to the gate drive circuit 96 to cause it to provide a gate driving pulse B having a predetermined duration to a driving mechanism (not shown) of the gate 20. Thus, the gate 20 is opened to discharge the contents of the cradle 18 into the first hopper 28a. Just after the pulse B terminates and the gate 20 is closed again, the output signal of the OR gate 80 delayed by the delay circuit 92 is applied to the gate drive circuit 94 to cause it to provide a gate driving pulse A having a predetermined duration to a driving mechanism (not shown) of the gate 16. Thus, the gate 16 is opened to load the vacant cradle 18 again with new articles. Just after the loading of the cradle 18 is completed, the delayed start signal ST' is applied from the delay circuit 56 through the OR gate 58b to the monostable multivibrator 58b. Similarly to the case of the monostable multivibrator 58a, the current weight signal Wb is written into the memory 40b. The delayed start signal ST' is also applied through the OR gate 84 to the gate drive circuit 98 to cause it to provide a driving pulse C having a predetermined duration to the hopper driving device 36. Thus, the driving device 36 moves the hopper assembly to its second position where the second hopper 28b is just under the cradle 18. Just after the holding hopper 28b comes under the cradle 18, the delayed start signal ST' is applied through the OR gate 86, delay circuit 88 and OR gate 80 to the gate drive circuit 96. Therefore, as described above, the gate 20 is opened to load the second hopper 28b with the contents of the cradle 18 and then the gate 16 is opened to load the vacant cradle 18 with new articles. After completion of loading of the second hopper 28b, the hopper assembly is returned to its initial position in response to the trailing edge of the pulse C. As the above operation has been executed in each weighing unit of the machine, all memories 40a and 40b are rendered to store the weight information Wa and Wb, respectively, and the machine is ready for combination selecting operation.

Until the above ready condition is reached, the start signal ST is held in the delay circuit 60 and then applied to the combination generator 48 to start it. The combination generator 48 produces a predetermined set of combinations of binary 37 1" and "0" signals successively from its 2n-number of output terminals, and those of the normally-open switches 42a and 42b applied with "1" signals are closed to pass the contents of the corresponding memories 40a and 40b to the summing circuit 44. The summing circuit 44 sums the incoming signals to provide a total weight indicating signal SUM to the judging circuit 46 having a predetermined condition of the total weight as preset therein. The judging circuit 46 compares the incoming SUM signal with the preset condition to provide an update signal UP every time the SUM signal better satisfies the preset condition to the combination memory 50. The combination memory 50 is arranged to update its content with the current input signals from the combination generator 48 in response to every UP signal and to discharge the content in response to an END signal provided from the combination generator 48 when the predetermined set of combinations have been presented completely, that is, when a cycle of the combination selecting operation completes. The structure and operation of the above mentioned components 44, 46, 48 and 50 are well known in the art and will not be described further.

Now, the description will be made about the operation of each gate control circuit 62 in response to a pair of input signals a and b applied from the combination memory 50 with logic levels "1" and/or "0", with reference to FIGS. 2, 3 and 4.

When the input levels of a and b are both "0", the output levels of the AND gates 64, 66 and 68 are all "0" and no driving signal is produced from any of the gate drive circuits 94, 96, 98, 100 and 102. Therefore, no change will occur in the corresponding weighing unit.

When the input levels of a and b are "1" and "0", respectively, that is, when the batch of articles within the holding hopper 28a is elected, the gate drive circuit 100 provides a gate driving pulse Da to the gate 30a to open it and, therefore, the content of the hopper 28a is discharged into the collecting chute 22. At the same time, the AND gate 66 produces a signal of logic "1" level, which is applied through the OR gates 74 and 54a to the monostable multivibrator 58a to close the switch 38a to write the weight information of the content of the cradle 18 into the memory 40a. The output signal of the OR gate 74 is also applied through the delay circuit 78 and OR gate 80 to the gate drive circuit 96. Accordingly, the gate 20 is opened to discharge the content of the cradle 18 into the vacant hopper 28a and then the gate 16 is opened to load the vacant cradle again with new articles. The delay circuit 76 serves to provide a suitable delay for preventing the gate 20 from being opened before the gate 30a is closed. Thus, the initial ready condition is restored.

When the input levels of a and b are "0" and "1", respectively, that is, when the batch of articles within the holding hopper 28b is elected, the gate drive circuit 102 provides a gate driving pulse Db to the gate 30b to open it and, therefore, the content of the hopper 28b is discharged into the collecting chute 22. At the same time, the AND gate 68 produces a signal of logic "1" level, which is applied through the OR gate 76 and delay circuit 82 to the OR gate 54b (FIG. 3). Thus, the monostable multivibrator 58b is actuated to close the switch 38b to write the weight information of the content of the cradle 18 into the memory 40b. The output signal of the delay circuit 82 is also applied to the OR gates 84 and 86. Therefore, as in the case of application of the delayed start signal ST', the hopper assembly is moved to its second position and the second hopper 28b is loaded with the content of the cradle 18. Thereafter, the vacant cradle is loaded again with new articles and, then, the hopper assembly is returned to its initial position. Thus, the initial ready condition is restored.

When both input levels a and b are "1", both gate drive circuits 100 and 102 provide gate driving pulses Da and Db, respectively, to discharge the contents of both holding hoppers 28a and 28b at the same time. These input levels also actuate the AND gate 64 which in turn actuates the OR gates 74 and 76. The output signal of the OR gate 74 is first applied through the OR gate 54a to the multivibrator 58a to write the current weight information into the memory 40a. Thereafter, as previously mentioned, the output signal of the OR gate 74 is applied through the delay circuit 78 to the OR gate 80, the content of the cradle 18 is discharged into the first holding hopper 28a and the vacant cradle 18 is loaded again with new articles. In addition, the output signal of the OR gate 76 is delayed until the cradle 18 is loaded again, and applied to the multivibrator 58b through the OR gate 54b to write the weight information of the new batch into the memory 40b. The output signal of the delay circuit 82 is also applied to both OR gates 84 and 86 and, as in the case of the application of the signal ST', the second holding hopper 28b is loaded with this new batch and the vacant cradle is loaded again. When the hopper assembly returns to its initial position, the initial ready condition is restored again.

When a selected one of the above mentioned four kinds of operation has been executed in each of the n-number of weighing units of the machine, the current operation cycle completes and the next start pulse ST is supplied from the start pulse generator 52 to initiate the next operation cycle.

Although, in the above mentioned embodiment, the holding hopper assembly includes two hoppers 28a and 28b, three or more hoppers can be included if the combination and gate control circuit is designed adequately. Moreover, the mechanical and electrical configurations shown in the drawings have been presented for explanatory purposes only and various modifications and changes may be made without departing from the scope of this invention as defined in the appended claims.

What is claimed is:

1. A combination weighing machine comprising a plurality of weighing units each weighing a plurality of articles and producing weight signals indicative of the weights thereof respectively, a common collecting chute, and a combination selecting circuit for receiving said weight signals, summing them in accordance with predetermined mathematical combinations and electing a specific combination providing a sum which satisfies a predetermined condition, each of said weighing units including a single weighing cradle, at least two holding hoppers, memories corresponding to said holding hoppers respectively, means for distributing the content of said cradle to each of said hoppers, and means for writing the weight signal corresponding to the content of said cradle into each of said memories before said content is distributed to said hopper, said combination selecting circuit including a circuit for producing a set of output signals which specify said memories which have provided those weight signals constituting said combination satisfying said predetermined conditions, and said machine further including first gating means for responding to said output signals to discharge the contents of said holding hoppers corresponding to said specified memories into said collecting chute.

2. A combination weighing machine according to claim 1 wherein said weighing cradle is positioned above said collecting chute, said holding hoppers are disposed between said cradle and collecting chute, said distributing means including a supporting member for supporting said hoppers integrally and driving means for moving said supporting member, and said machine further including means of generating a control signal for controlling said driving means in response to said output signals and positioning said hopper corresponding to said specified memory just under said weighing cradle, and second gating means for responding to said positioning of the hopper to discharge the content of said weighing cradle into the last said hopper.

3. A combination weighing machine according to claim 1 wherein said writing means include switching means responsive to said specifying output signals for coupling said weighing unit to said specified memory.

* * * * *